Feb. 1, 1955   L. WATTIER   2,701,096
CALCULATING APPARATUS
Filed Feb. 5, 1951   2 Sheets-Sheet 2

INVENTOR:-
LOUIS WATTIER
BY:-
Chatwin & Company
ATTYS.

United States Patent Office

2,701,096
Patented Feb. 1, 1955

2,701,096

CALCULATING APPARATUS

Louis Wattier, Paris, France

Application February 5, 1951, Serial No. 209,374

Claims priority, application France February 10, 1950

4 Claims. (Cl. 235—61)

The present invention relates to a calculating apparatus based on the use of the properties of homothetic triangles. This apparatus, which is termed a "homothetic calculator" is extremely simple in construction and use; it permits of obtaining, by direct reading, all multiplying or reducing ratios of measurements or of numbers generally, to effect multiplications, raising a number to any power, divisions, three dimensional rules, squares and cubes, obtention of square and cube roots, the determination of sines, cosines and tangents of a given angle or vice versa and in short all those operations which can be obtained with a logarithmic calculating rule with the exception of the determination of logarithms.

In order that the invention may be more readily understood some examples of construction thereof are shown by way of example in the accompanying drawings wherein.

The principle of the apparatus is to utilise two main graduations provided on two relatively movable members in such a manner that these graduations measure in the same units the distances, from a homothetic centre, for each relative position of the graduated elements, of the intersections of the various divisions of the graduations corresponding to numbers the ratio of which is constant. Each of the graduated elements is divided into ten main units so that the constant ratio can always be expressed by a fraction, one of the terms of which will be 1 or 10.

It may be assumed that a multiplication or a division can always be made in the following forms:

$$\frac{X}{A} = \frac{B}{1} \text{ for the multiplication}$$

and $$\frac{X}{1} = \frac{A}{B} \text{ for the division}$$

Thus if one forms, by the intersection of the corresponding divisions, the ratio B/1 or B/10 there will be obtained, on the graduation of the member on which the value B has been read, a number X read off opposite division A on the other element on which the division 1 or 10 has been read. If the ratio A/B is formed, the quotient X of the division can be read opposite 1 or 10.

Figure 1:
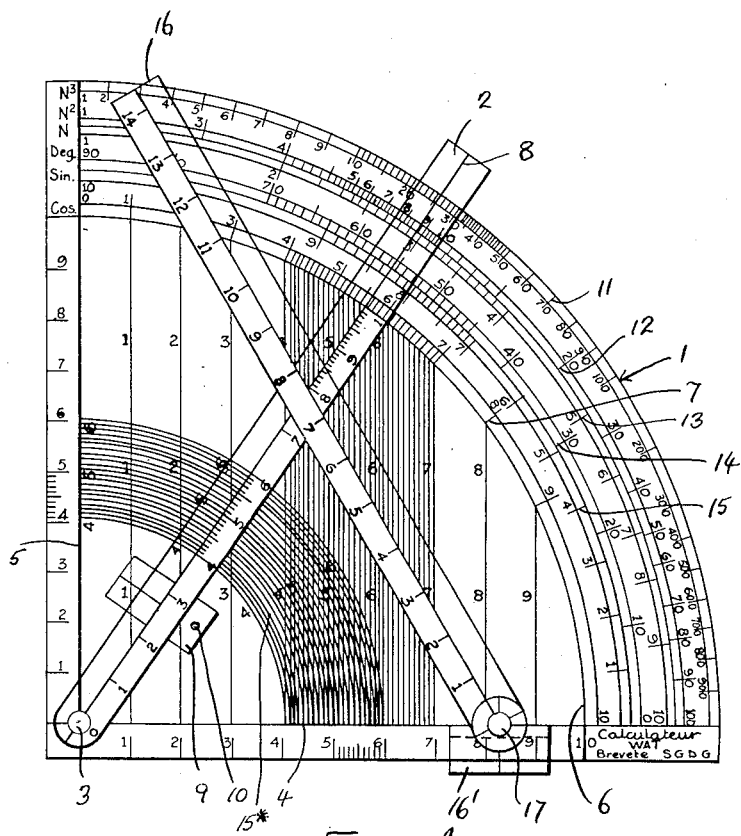
Fig. 1 is a plan view of a quadrant-type calculator corresponding to conical constructions illustrated in Figs. 2 and 3 and given for the purpose of explaining the method of operation thereof.

In Fig. 1 of the accompanying drawings, the quadrant calculator comprises a quadrant dial 1 and a movable alidade 2 mounted thereon by a pivot 3 at the centre of revolution of the quadrant. On the quadrant are drawn two perpendicular radii 4 and 5 and a quarter circle 6. The radius 4 is divided, by lines parallel to the radius 5, into ten equal main divisions numbered 1 to 10 from the centre. Each main division is subdivided into ten and each such sub-division may if desired be further sub-divided according to the size of the apparatus. The parallel lines terminate at the quarter-circle 6 which they divide into unequal parts constituting a circumferential graduation 7. The alidade 2 has a central line 8 passing through the pivot 3 and that part of the alidade defined between the edge nearer to the radius 4 and the central line 8, and between the centre and the quarter circle 6 is opaque, the remainder being transparent. The part of the central line 8 between the pivot 3 and the quarter circle 6 has similarly spaced graduations to the radius 4. It will be seen that the parallel lines form, with the radius 4 and the central line 8 of the alidade, right-angled triangles of which the alidade is the hypotenuse, and the sides of which are proportional. A small cursor 9 is slidably carried on the alidade 2 to facilitate reading. A blind hole 10 is provided to permit movement with the point of a pencil.

The method of using the apparatus is as follows:

*Problem.*—To find ratios which are equal to $$\frac{27}{38}$$

The alidade 2 is displaced up to the intersection of its division 38 with the parallel line corresponding to the division 27 of the radius 4. The intersections of the divisions of the alidade and of parallel lines will correspond to equal ratios to $$\frac{27}{38}$$

The median line 8 of the alidade will give on the circumferential graduation 7 the numerator of the corresponding decimal fraction, viz. 71%.

*Multiplication of two numbers*

The median line 8 of the alidade is placed on the division of the graduation 7 corresponding with one of the numbers and the product is read on the parallel lines opposite the second number read on the graduation of the alidade.

In the case where the product of the first two figures of the two numbers to be multiplied, increased by the carry over figures, is less than 10, it is better in order to retain the same approximation of reading, to use the 1 of the parallel lines instead of the 10 of the alidade. One of the numbers read is read on the alidade opposite to the parallel line 1 and the product is read on the graduation of the alidade opposite the second number read on the parallel lines.

*Powers.*—The median line 8 of the alidade is placed on the division of the graduation 7 corresponding to the number which it is desired to raise to a given power.

The second power is read on the parallel lines graduation opposite the number read on the alidade. The third power can be read on the parallel lines opposite the second power read on the alidade.

*Division.*—The numbers to be divided one into the other are found one on the alidade and one on the parallel lines, and the quotient is read on the circumferential graduation 7 if the dividend commencing with a smaller figure than the divisor can be read on the dial or, on the alidade, opposite the parallel line 1 of the dial, in the contrary case.

*Three dimensional rules.*—This occurs in the form $$X = \frac{A \times B}{C}$$

The alidade is displaced to form the ratio B/C and it will read:

X on the same graduation as that where B was read and opposite A on the other graduation.

*Squares and cubes.*—Square root and cube root*

To effect the operations as readily as with a slide rule, there have been provided three special circumferential graduations; a graduation 11 which is that for the cubes, a graduation 12 which is that for the squares and a graduation 13 which serves both for the square roots and the cube roots.

The graduation 11 is an arithmetical and not a logarithmic graduation and is formed by dividing the corresponding quarter circumference into three scales; one graduated from 1 to 10, another from 10 to 100 and the third from 100 to 1000, each main division being sub-divided at least into ten.

Each of the principal divisions is equal to $\frac{1}{30}$ of the length of ¼ of the circumference except the divisions between 10 and 20 and between 100 and 200 which are equal to $\frac{1}{15}$ of this same length; and between 20 and 30 and 200 and 300 equal to $\frac{1}{20}$.

The graduation 13 of the roots is established by means of a table of cubes by making the radiating divisions correspond. For example the "two" of graduation 13 is drawn opposite the "eight" of graduation 11.

The length of certain divisions of the graduation 11 is increased to regulate as much as possible the lengths of the divisions of the graduation 13 which would have been reduced too much for the changing of scales.

It should be noted that the graduations thus obtained are much more regular and therefore easier to read and of a much more constant approximation than is possible with logarithmic calculating scales especially as regards the cubes and cube roots.

Naturally it is possible to adopt other proportions than those indicated for the enlarged divisions.

To obtain the graduation 12 for the square, start with graduation 13 for the roots by using a table for square roots. The two is brought, for instance, opposite 1414 of the graduation 13.

Squares, cubes, square roots and cube roots are easily obtained by causing one scale to correspond with the other by using the median line 8 of the alidade.

Trigonometric elements

For this purpose a circumferential graduation 14 has been provided marked in degrees. It will be seen that the quarter circle 6 having a radius 10, the figures of the graduation 7 corresponding to the different angles of the graduation 14 gives cosines and angles. Another graduation 15 gives the sines, this graduation being obtained either by means of a table by corresponding with the graduation in degrees, or in relation to the circumferential graduations 7 which will be obtained by dividing the radius 5 of the dial by lines parallel to the radius 4.

The combination of the three graduations 7, 15 and 15 permits of simultaneously obtaining the sines and cosines of a given angle by a single displacement of the alidade and by reading on the parallel lines of the dial, the product of the sine or cosine by any number read on the alidade.

The tangent of an angle is obtained by the ratio $$\frac{\text{sine}}{\text{cosine}}$$

In certain cases, to obtain a simpler apparatus, by eliminating the need for graduating the alidade itself, a concentric graduation 15* is provided on the dial 1. This concentric graduation can advantageously be made of another colour than that of the parallel graduations of the dial.

In apparatus of large dimensions for office practice, the dial can be divided by a grid of lines parallel to the perpendicular radii 4 and 5 and, by using an arm 16 pivoted at 17 on a movable head $16^1$ slidable along the radius 4 of the dial, it is possible not only to effect all the operations which are made with logarithmic rules but also to effect a large number of graphic calculations and particularly the resolving of triangles without using trigonometric elements. The head $16^1$ could comprise a small protractor for determining angles.

Figure 2:
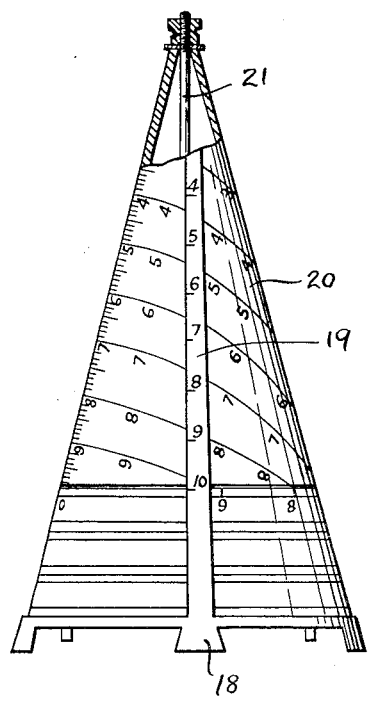
Figure 2 is an elevation of a first conical construction of the apparatus, with part in section.

Figure 2 of the accompanying drawings represents in elevation a preferred embodiment of homothetic calculator of conical form the cone of which corresponds to the rolling of a quadrant which then becomes the top of the cone.

A base 18 supports arms 19 (one being illustrated and another being disposed symmetrically at the other side of the device) said arms being disposed along generatrices of a cone 20 carried rotatably on a fixed central spindle 21 mounted on the base 18. The arms 19 are provided with linear graduations from 1–10 starting at the apex of the cone, and the cone itself is provided with graduations 1–10, likewise starting at its apex, along a generatrix. Each graduation on the cone is continued as one of a series of parallels which extend to the circular lower end of the cone to coact with a peripheral circular scale marked on the base. Rotation of the cone manually within the arms 19 corresponds to moving the dial 1 of Fig. 1 whilst keeping the alidade 2 thereof stationary. Calculations are carried out in the same manner as has been described for Fig. 1.

Figure 3:
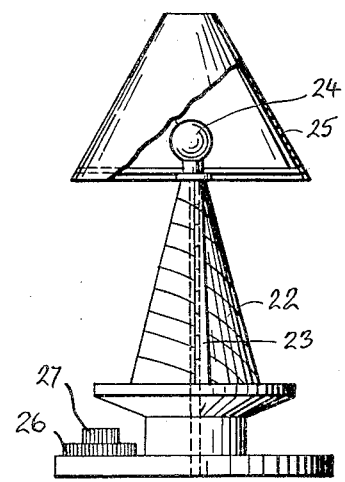
Figure 3 is an elevation of a second conical construction with part in section.

In Fig. 3 which shows another preferred embodiment, the construction and graduation of the cone 22 and arms 23 are similar to the cone 20 and arms 19 of Fig. 2 but the spindle 21 is utilised to support a bulb 24 and shade 25 to constitute a table lamp. 26 and 27 denote two knobs which may be coupled in any suitable manner to the cone 22 for its rotation at coarse and fine speeds.

The supporting spindle for the cone, corresponding to the spindle 21 of Fig. 2, is advantageously made hollow for the passage of wires for the lamp. Calculations are made in precisely the same manner as for Fig. 2.

I claim:
1. Calculating apparatus comprising a supporting frame having an upright spindle, a graduated cone rotatably mounted thereon with the spindle at its axis, means on the frame for manual rotation of the cone, scale-bearing members on the supporting frame arranged externally along generatrices of the cone, and a graduated scale on the supporting frame arranged adjacent the base of the cone.

2. Calculating apparatus comprising a graduated cone, a supporting frame for the cone in which the cone is rotatably mounted, scale-bearing members on the supporting frame arranged along generatrices of the cone, and a graduated scale on the supporting frame arranged adjacent the base of the cone.

3. A calculating apparatus comprising a cone the diameter of the base of which is equal to half of its generatrix and corresponding to the rolling of a quarter of a circle about a vertical axis passing through its centre, said cone comprising a principal graduation on parallel spiral lines starting from one generatrix of the cone graduated in ten equal divisions numbered "1" to "10" starting from the apex and sub-divided into decimal sub-divisions, said parallel spiral lines corresponding to the disposition about the cone of straight parallel lines perpendicular to one of the radii of the said quarter circle said cone pivoting at the interior of a frame comprising members tangential to generatrices of the cone and graduated into ten equal divisions numbered from "0" to "10" starting from the apex and sub-divided into decimal sub-divisions, this graduation corresponding to the graduation of the generatrix from which the parallel lines of the cone commence, rotation of the cone at the interior of its frame permitting, by combination of the graduations of the cone and those of the frame, to effect multiplication, division and all consequent mathematical operations, the cone further comprising at its lower part circular graduations parallel to its base permitting, by their combination with the extension of the line of graduation of the members of the frame, to effect the determination of cosines and tangents, squares, cubes, square roots and cubic roots.

4. Calculating apparatus comprising a cone the diameter of the base of which is half its generatrix, said cone having thereon a first graduation consisting of spiral parallel lines and other graduations consisting of scale lines parallel to its base, a supporting frame for the cone in which the cone is rotatably mounted, members on the supporting frame arranged along generatrices of the cone, said members bearing a scale line passing through the apex of the cone and graduated in ten main divisions starting from the apex, and a graduated scale on the supporting frame arranged adjacent the base of the cone.

References Cited in the file of this patent

UNITED STATES PATENTS

| Number | Name | Date |
|---|---|---|
| 213,234 | Mudd | Mar. 11, 1879 |
| 378,257 | Leschorn | Feb. 21, 1888 |
| 1,042,360 | Maguire | Oct. 22, 1912 |
| 1,096,507 | Hopkinson | May 12, 1914 |
| 1,290,343 | Posner | Jan. 7, 1919 |
| 1,559,665 | Beery et al. | Nov. 3, 1925 |
| 1,598,600 | Butterfield | Sept. 7, 1926 |
| 1,672,950 | Mittendorf | June 12, 1928 |
| 1,768,285 | Bigelow | June 24, 1930 |
| 2,436,352 | Downs | Feb. 17, 1948 |

FOREIGN PATENTS

| Number | Country | Date |
|---|---|---|
| 755 | Great Britain | Jan. 18, 1886 |
| 320,190 | Germany | Apr. 12, 1920 |
| 638,773 | France | Feb. 27, 1928 |
| 320,463 | Italy | Aug. 22, 1934 |
| 54,769 | Norway | Jan. 7, 1935 |

OTHER REFERENCES

Pages 94 and 95 of "Kent's Mechanical Engineers Pocket-Book," by William Kent and published by John Wiley and Sons in N. Y. in 1910.